United States Patent
Harley

(10) Patent No.: US 9,201,152 B2
(45) Date of Patent: Dec. 1, 2015

(54) SEISMIC PREDICTION WITH DECAY PRODUCTS

(71) Applicant: New York University, New York, NY (US)

(72) Inventor: Naomi H. Harley, New York, NY (US)

(73) Assignee: NEW YORK UNIVERSITY, New York, NY (US)

(*) Notice: Subject to any disclaimer, the term of this patent is extended or adjusted under 35 U.S.C. 154(b) by 113 days.

(21) Appl. No.: 14/029,291

(22) Filed: Sep. 17, 2013

(65) Prior Publication Data

US 2014/0077074 A1  Mar. 20, 2014

Related U.S. Application Data

(60) Provisional application No. 61/702,139, filed on Sep. 17, 2012.

(51) Int. Cl.
*G01V 5/00* (2006.01)
*G01V 1/00* (2006.01)
*G01V 9/00* (2006.01)

(52) U.S. Cl.
CPC ............... *G01V 1/008* (2013.01); *G01V 9/007* (2013.01); *Y10S 250/02* (2013.01)

(58) Field of Classification Search
CPC .. G01V 1/008; G01V 5/04–5/06; G06T 1/178
See application file for complete search history.

(56) References Cited

U.S. PATENT DOCUMENTS

| | | | | |
|---|---|---|---|---|
| 4,920,263 | A * | 4/1990 | Fimian et al. | 250/255 |
| 4,963,730 | A * | 10/1990 | Tetley et al. | 250/253 |
| 7,597,015 | B2 | 10/2009 | Harley | |
| 2010/0224769 | A1 * | 9/2010 | Lane-Smith | 250/252.1 |

OTHER PUBLICATIONS

Friedmann, H., "Radon in Earthquake Prediction Research", Radiation Protection Dosimetry (2012), vol. 149, No. 2, pp. 177-184.

* cited by examiner

*Primary Examiner* — Casey Bryant
*Assistant Examiner* — Mamadou Faye
(74) *Attorney, Agent, or Firm* — Foley & Lardner LLP

(57) ABSTRACT

A system and methods relating to the detection of unattached radioactive particles. Seismic events are correlated with an increased release of radon and related decay chain products. An apparatus is described for determining the increase in the unattached particles as an indicator for seismic activity. The apparatus may be used with fracking rigs or petrochemical wells to provide controls responsive to predicted seismic events.

23 Claims, 9 Drawing Sheets

SEISMIC PREDICTION WITH DECAY PRODUCTS

CROSS REFERENCES TO RELATED APPLICATION

This application claims priority to U.S. Provisional Application 61/702139, filed Sep. 17, 2012, incorporated herein by reference in its entirety.

FIELD OF THE INVENTION

The present invention generally relates to radiation decay products. Specifically, embodiments relate to radon decay products and seismic even detection.

BACKGROUND

Radon decay has previously been studied and the typical decay pathway is known. Radon itself a decay product from uranium and thorium. There are some hundreds of publications devoted to earthquake research and a significant fraction of these include the measurement of radon ($^{222}$Rn) (Friedman, 2010, Klusman et al., 1981, Mogro-Campero, 1980). Studies include seismic velocity changes, tilting of the earth's surface, strain accumulation, soil gas helium, mercury, radon emanation rate and radon increase in ground water. Changes in soil gas radon and groundwater are measured indicators. As yet there are no measurements of thoron ($^{220}$Rn) emanation rate as a predictor of stress accumulation in soil.

SUMMARY

Long term (4 month) measurements of the particle size distribution in outdoor air were made at two locations using the long lived radon decay product $^{210}$Pb as the tracer for short lived radon decay products, $^{218}$Po (3.05 min), $^{214}$Pb (26.8 min) and $^{214}$Bi (19.7 min). The sites were, outdoors at a New Jersey home and at Fernald, Ohio, the former uranium processing facility, on top of their large (150 TBq, but contained) $^{226}$Ra source in storage silos. The particle size distribution measurements showed the unattached fraction of radon decay products ($^{218}$Po) to be <2% in typical outdoor air but 16% over the large source of $^{226}$Ra. Radon decays to $^{218}$Po and its buildup over a "freshly" emanating $^{226}$Ra source of radon permits the unattached $^{218}$Po (2-4 nm) to rapidly trace changing local radon concentrations. The concentration ratio (silo/outdoor) of unattached decay products (16/2) was not in line with the radon concentration ratios (96 Bq m$^{-3}$/27 Bq m$^{-3}$) because radon gas has longer time to disperse and dilute.

It is proposed that real time, rather than our long term proof of principle measurements of unattached radon decay products ($^{218}$Po/$^{214}$Pb) made in the present research, may be used to identify rapidly changing radon concentration. Radon is shown to exhibit increased exhalation from soil prior to earthquakes mainly due to microfracture cracks and increased soil porosity.

Additional features, advantages, and embodiments of the present disclosure may be set forth from consideration of the following detailed description, drawings, and claims. Moreover, it is to be understood that both the foregoing summary of the present disclosure and the following detailed description are exemplary and intended to provide further explanation without further limiting the scope of the present disclosure claimed.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

DETAILED DESCRIPTION OF THE PREFERRED EMBODIMENTS

Figure 1A:
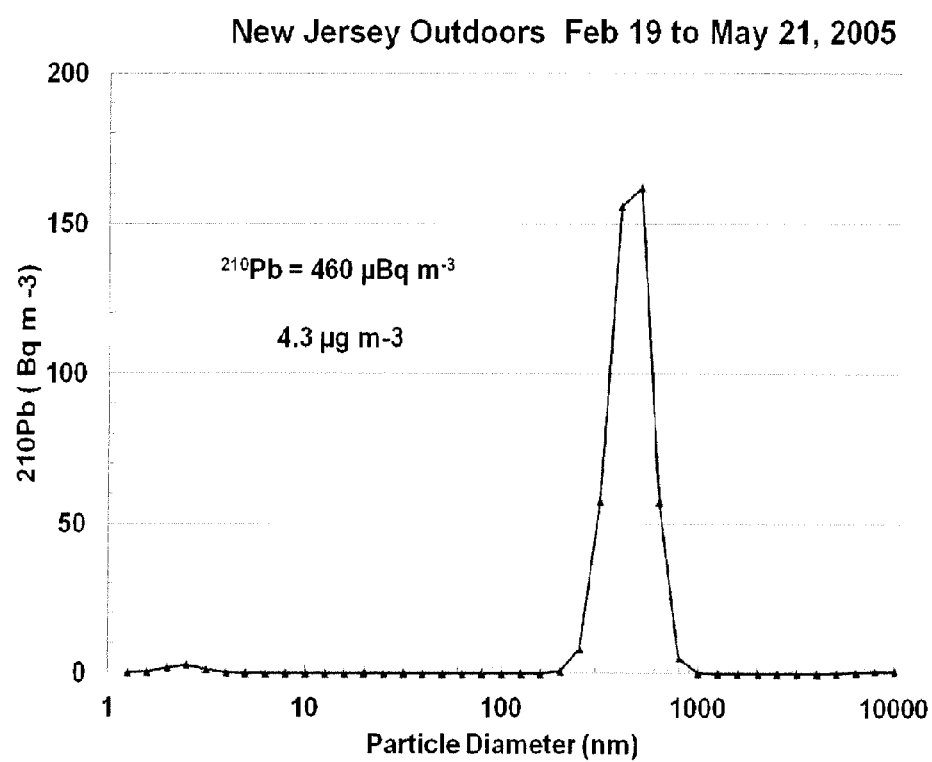
FIGS. 1A-B illustrate aerosol particle diameter distribution measured at a New Jersey home 19 Feb. to 21 May 2005 using a integrating miniature particle size ("IMP") sampler.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

Earthquakes or other seismic events may be preceded by microfracturing and other increases in soil porosity along with releases of subterranean materials, particularly gases or liquids. Detection of radioactive elements released from below the earth's surface can be utilized to determine microfacturing or other stresses that may be indicative of an earthquake. The ratio of a detectable decay element that serves as an immediate tracer of the time variation of an local radioactive element "upstream" in the decay chain may be utilized. The ratio may be monitored to determine when it exceeds a certain threshold associated with seismic activity, i.e. a threshold considered significant and above a "noise" or background level. Further, the ratio may be monitored to determine a rate of change in the ratio to provide an indication of the direction of change, for example is a release of radon increasing or decreasing. Further, in certain implementations the concentration of a particular element in the decay chain is used rather than a ratio. In a further implementation, the concentration of one species of a particular element, such as those unattached to aerosols, is used. It is believed that the concentration of the unattached (very small size 1-5 nm) decay product $^{218}$Po is the key to a pressure pulse, i.e., initiation prior to a seismic event. There is a background concentration of unattached due to normal soil diffusion of radon and unattached 218Po formation. A baseline can be established for a location using ongoing measurements. For example, the baseline can be the average of daily measurements for each month. A concentration of unattached $^{218}$Po significantly above this baseline indicates an underground pressure pulse. In one embodiment, this would be at least a specific increase over a specific time duration. For example, say a factor of 2 increase in $^{218}$Po over 4 hours duration.

In one embodiment, methods and systems rely on the fact that the radon decay product, $^{218}$Po, formed as a positively charged atom from radon decay. A fraction of $^{218}$Po atoms are neutralized and all $^{218}$Po rapidly form molecular clusters of about 0.5 to 5 nm diameter with water vapor or other constituent molecules. These nanometer size decay products are called the unattached fraction of radon decay products. Some unattached $^{218}$Po decays to $^{214}$Pb which remains unattached (nanometer diameter) with the ratio of unattached $^{218}$Po/$^{214}$Pb about 10/1. Within about 30 seconds a cluster attaches to the local aerosol particles usually 200-400 nm diameter and are attached decay products. Therefore, the unattached decay products are immediate tracers of the time variation of the local radon concentration wherever they are measured.

Increased radon emanation from soil can be directly related to microfracturing due to stress and increase in soil porosity (Ramola et al., 2008). Real time monitoring of the unattached fraction of $^{218}$Po or $^{214}$Pb above ground or in a below ground vault, provides a criterion for earthquake prediction. A sharp increase in the concentration of unattached $^{218}$Po or $^{214}$Pb or in the ratio of unattached to attached is an indication of a release of radioactive decay chain materials from the soil, which is predictive of seismic activity.

The entire decay product chain $^{218}$Po, $^{214}$Pb, $^{214}$Bi can be utilized with systems and methods of various embodiments, as their effective half-life is relatively short (about 30 minutes). Because most are attached to larger particles (200-400 nm) their capture gets complicated by the fact that the total activity must be measured with a filter that captures everything. Thus, for embodiments using decay products that attach to larger particles, a backup filter is used and measured.

The unattached $^{218}$Po only exists for about 30 seconds before attaching to the local aerosol particles. Because of its small diameter, a single screen filter captures about 60%. Thus, $^{218}$Po is preferred because it is tracking $^{222}$Rn (radon) rapidly and selectively.

There is a slight complication in measuring total decay products. The Thorium decay series ($^{222}$radon is in the uranium decay series) has another radon isotope, $^{220}$Rn (thoron). This is usually at a much lower concentration than $^{222}$Rn (radon). The thoron decay product $^{212}$Pb has a 10 hour half-life and contributes to the total activity. However, for certain embodiments, the presence of this decay product can be ignored because it would be in the background baseline. Further, the 22 year half-life $^{210}$Pb radon decay product can similarly be ignored.

Systems and methods of invention may apply to seismic events, including induced seismic events from human activity such as hydraulic fracturing. In one embodiment, the detection of increased radon or radon decay chain elements can be utilized in a mining, drilling, or other subterranean extraction processes. In particular, the systems and methods described herein may be utilized with hydraulic fracturing. Specifically, the well head or upstream from the well head in the well sensors may be utilized to detect the changes in concentrations of radioactive elements. Further, the flowback from the fracturing may be monitored to determine the concentrations of radioactive elements.

Other implementations of the present invention may be related to environmental monitoring. The absolute level of elements (or a ratio of elements) within a decay chain may be monitored or the rate of change of an element (or a ratio of elements) within the decay chain.

In one implementation, a system is provided for monitoring the unattached fraction, such as either by concentration or by ratio to the attached fraction. In one implementation the system includes a real-time monitoring apparatus and may include a long term monitoring apparatus. The real-time monitoring apparatus provides information on the concentration of the unattached fraction or the ratio of the unattached to the attached fraction. In one implementation, the long term monitoring apparatus provides information regarding one or more of the aerosol level of the environment, and the attached fraction concentration.

Figure 6:
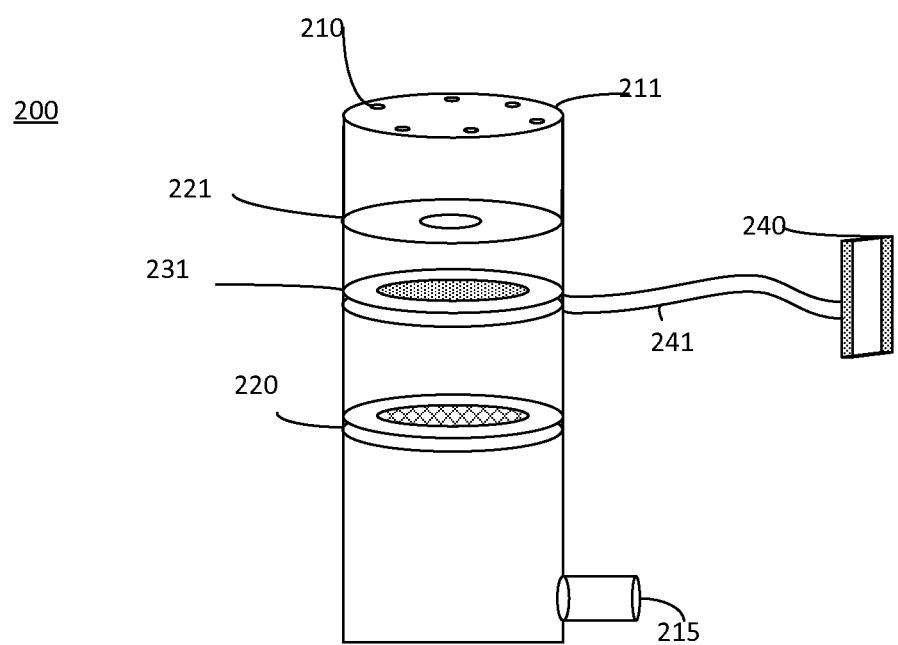
FIG. 6 illustrates a collection vessel.
Figure 7:
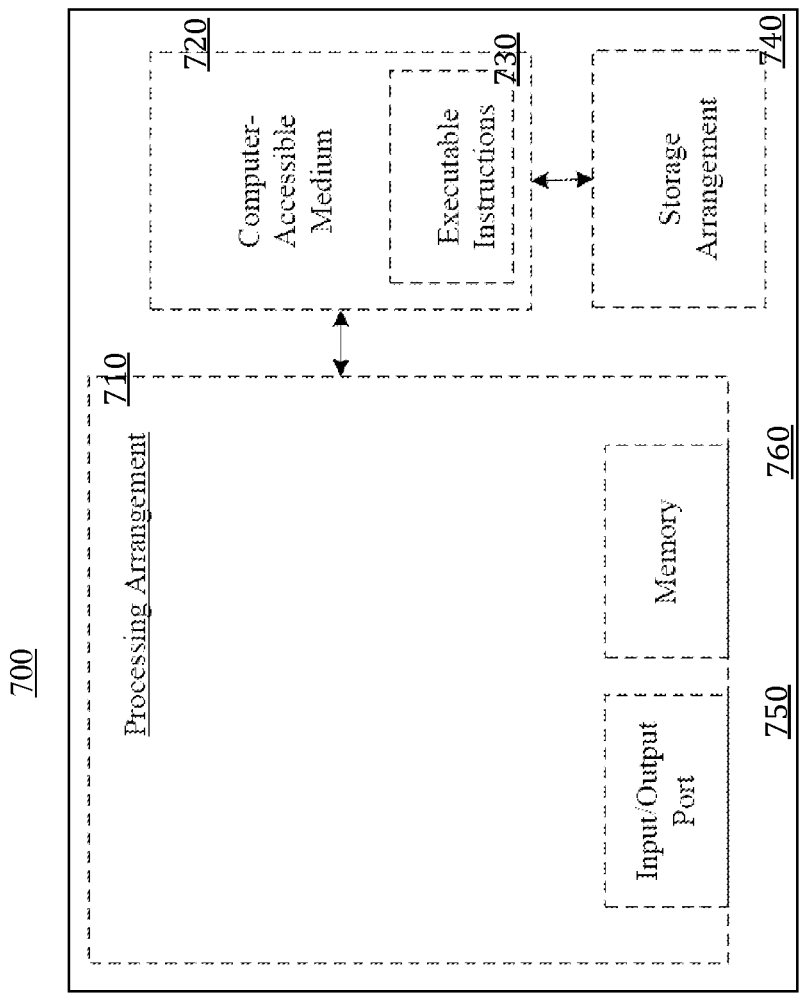
FIG. 7 illustrates a computer system for use with certain implementations.

In one implementation, the real-time monitoring device comprises a collection vessel 200. One implementation is illustrated in FIG. 6. The collection vessel 200 is particle size selective such that larger particles, particularly the attached fraction, are filtered from the small particles, particularly the unattached fraction. The collection vessel 200 includes an inlet 210 that provides an area for particles to enter the vessel 200. In one embodiment, the inlet 210 is a plurality of holes in a surface of the vessel 200, such as an inlet plate 211 serving as a top portion of the vessel 200. One or more filters 220 may be provided to selectively capture particles of a predetermined size. An impactor plate 221 may be included above the scinllation screen 231. Inlets 210 about the periphery and an impactor plate 221 with a central opening (e.g., approximately ¼ the diameter of the vessel 200) function to filter the larger particles which cannot "turn" quickly enough to avoid hitting the impactor plate 221. The smaller, lighter particles such as unattached $^{218}$Po will be able to transition from the outer periphery at the inlet to the inner portion to pass though the impactor plate. In one implementation, a scintillation screen 231 is included. The scintillation screen 231 is positioned downstream (with respect to the air flow) from the impactor 221 and may be upstream from the filter 220. The scintillation screen 231 fluoresces when struck by an alpha particle. Very small particles, about 0.5 to 5 nanometers, have a large diffusion coefficient and because they are moving rapidly and they interact with the screen efficiently(only unattached get collected). Larger particles just pass through the screen without interacting. Because only a small percentage of unattached radioactive elements would be other than $^{218}$Po, the scintillation screen 231 can be correlated to unattached $^{218}$Po. In one implementation, the scintillation screen is about 60 to about 400 mesh, i.e., openings per inch.

In one implementation, the light pulse generated when an alpha particle from $^{218}$Po hits the screen 231 is channeled via a fiber optic channel to a phototube. In one implementation, the collection vessel includes an outlet 215 to allow the filtered air to pass. An counting/imaging mechanism 240, such as a phototube, is utilized to capture the fluorescence. The imaging mechanism 240, in one implementation, includes a phototube and a scaler and software to record counts for remote access etc. The phototube is optically coupled via connector 241, for example fiber optic cable, to the scintillation screen 231. Phototubes are the standard to detect the light signal from the/any scintillation phosphor. The phototube turns one light pulse into a voltage pulse and the voltage operates the counting system to measure one count on a scaler. Then digital electronics in the counting/imaging mechanism 240 can integrate the counts for selected time intervals, store them for downloading, be accessed remotely and other marvelous things like, sending the data, graphing on phones or computers remotely.

In on implementation, the counting mechanism 240, is a digital signal sensor, positioned in communication with the phototube. The screen 231 collecting the unattached fraction can, in one implementation, be made of a scintillation material. When unattached $^{218}$Po is deposited on the screen it emits an alpha particle that hits/interacts with the scintillation phosphor and emits a light pulse. As noted above, a fiber optic 241 (one or more) may be connected to a counting mechanism 240, such as a standard scintillation detector (small phototube), to record each light pulse i.e., a count in a scaler.

For example, the imaging mechanism may operate as a counter, recording a "count" each time the scintillation screen fluoresces. It should be appreciated that the scintillation screen may fluoresce in more than one location at the same time and that the system can accommodate that and count each emission as a single count. Each count from the scintillation screen is directly related to the airborne concentration of $^{218}$Po through a calibration factor. The calibration factor can be determined, in one embodiment, from the background level of unattached $^{218}$Po, such as determined in the manner described herein.

In one implementation, a solid state sensor may be used for real time monitoring. The solid state sensor gives alpha particle energy as well as the activity in a radioactive source. However. the solid state sensor is positioned to view the screen directly over or under.

It is believed that there are significant pressures in the earth near an upcoming seismic event of any kind, including but not limited to fracking The earth has to start moving in some way before internal pressures are great enough to cause actual slippage. This movement may be caused by natural geologic sources or man-made stress sources such as fracking, construction, or significant terraforming of an area such as damning of a waterway. These stresses squeeze radon over and above the normal ground soil diffusion release.

In one implementation, the monitoring system is in communication with a control system of associated with a fracking rig. When the monitoring system detects that the likelihood of a seismic event is above a predetermined threshold, the control system can shut down or regulated. The control of the fracking rig or the extraction process may be for preservation, i.e. because a seismic event is predicted the rig is put in a position to minimize damage if a seismic event does occur. For example, once extraction has begun, if a seismic event is predicted, the well head may be capped or additional flare pipes engaged to deal with the impact of a possible seismic event on the well. The control of the fracking rig or extraction process may also be preventative, i.e. the fracking process may be modified to try to reduce the stress on the rock to less the likelihood or severity of a seismic event. For example, as fracking typically utilizes a pressurized liquid, the pressure may be reduced. Further, the size of the proppant used to hold the fracture open may be altered, such as reduced, in response to a predicted seismic event.

EXAMPLE

Long term particle size distribution measurements were made in two locations: (1) typical New Jersey outdoor air and (2) over a large but contained $^{226}$Ra source at Fernald, Ohio the former uranium processing facility. The measurements show that the unattached fraction of radon decay products can be used as short term tracers of the local radon concentration with unattached fraction over the $^{226}$Ra source a factor of about 8 larger.

An integrating miniature particle size sampler (IMP) was developed to determine the long term average particle size distribution for the purpose of calculating accurate exposure assessment for lung and bronchial dose from exposure to radon decay products.

Screen arrays are used extensively to collect aerosol particles for aerosol size assessment (Cheng et al.,1992). The equations for penetration efficiency has been determined in many experiments. The IMP (diameter 3.5 cm, height 3.5 cm) has 6 filtration stages, one inlet impactor stage with size cutoff of about 2.5 μm, is followed by 4 fine mesh stainless steel screens and an exit Millipore backup filter to capture all residual particles. Each sampler operates with a low flow Gast pump (4-6 lpm). The IMP sampler can operate for up to 5 months depending upon the airborne aerosol mass. Radon gas exists in all atmospheres producing its alpha particle emitting decay products. The short lived decay products of radon decay to long lived $^{120}$Pb (22 y) and $^{210}$Po (138 d). The $^{210}$Pb on the filtration stages arises either from deposited short lived decay products or $^{210}$Pb sampled from the atmosphere. The $^{210}$Po decay product of $^{210}$Pb is an alpha emitter and all filtration stages are measured directly in the low background (5 counts per day) alpha scintillation counters (Harley et al. 2012) after disassembly from the sampling head. This technique is useful for long term sampling but real time monitoring at short intervals for the unattached $^{218}$Po is best for rapid predictive purposes.

The particle size distribution in the IMP is calculated from the measured alpha activity on the 6 filtration stages using a deconvolution program developed by Patti Pentero of the University of Helsinki The $^{210}$Pb/$^{210}$Po are exquisitely sensitive tracers for atmospheric particles. The integrated aerosol particle size distribution (from 1 to 10,000 nm) and concentration were determined. In the long term $^{210}$ Pb/$^{210}$Po IMP system the measured radioactivity on the 6 filtration stages is subject to computer software (deconvolution program) to obtain the particle size spectrum.

In contrast to the setup for the background determinations, in one embodiment the collection vessel 200 relies upon the mesh size of the scintillation screen 231 to "select" for the unattached particles, i.e particles about 0.5 to about 5 nm in size.

The average value of the $^{218}$Po attachment rate to aerosol particles was measured as 0.025 sec$^{-1}$ (El-Hussein 1996). The half-life of an unattached cluster can be estimated as, $$\lambda_{Att}=0.025 \text{ sec}^{-1}=\ln(2)/T_{1/2}; T_{1/2}=27 \text{ sec}$$

This provides evidence that unattached $^{218}$Po is a short time variation tracer for any radon concentration.

However, the steady state concentration of unattached $^{218}$Po, $^{214}$Pb is mainly dependent on the local aerosol concentration and so can change due to normal aerosol fluctuations (El-Hussein 1996). It can be shown that the steady state fraction of unattached $^{218}$Po, $^{214}$Pb is $$f_{218}=\lambda_{218}/[\beta+\lambda_{218}]$$

and of $^{214}$Pb is $$f_{214}=\lambda_{214}/[\beta+\lambda_{214}]$$

Where, $f_{218}$=ratio of $^{218}$Po (unattached)/$^{222}$Rn
N=aerosol particle concentration/cm$^3$
β=Attachment coefficient for any species, charged or uncharged=[(10$^{-5}$) (N)]
10$^{-5}$ is the attachment rate in cm$^{-3}$ sec$^{-1}$
$\lambda_{218,214}$ etc.=decay constant for $^{218}$Po, $^{214}$Pb=0.00379 sec$^{-1}$, 0.000418 sec$^{-1}$ For an aerosol particle concentration of 10$^4$ particles cm$^{-3}$ $$f_{218}=0.00379/[0.1+0.00379]=0.036 \text{ or about } 4\%$$

If the aerosol concentration were to increase to 2×10$^4$ particles cm$^{-3}$ the steady state unattached fraction of $^{218}$Po would be 0.019 or about 2%, a factor of 2 change in unattached concentration.

RESULTS

The measurements presented are from two sources: 1) outdoor particle size distribution measurements at a New Jersey home and 2) outdoor particle size distribution measurements on top of the 150 TBq $^{226}$Ra storage silos at Fernald, Ohio a former uranium processing facility.

Figure 1B:
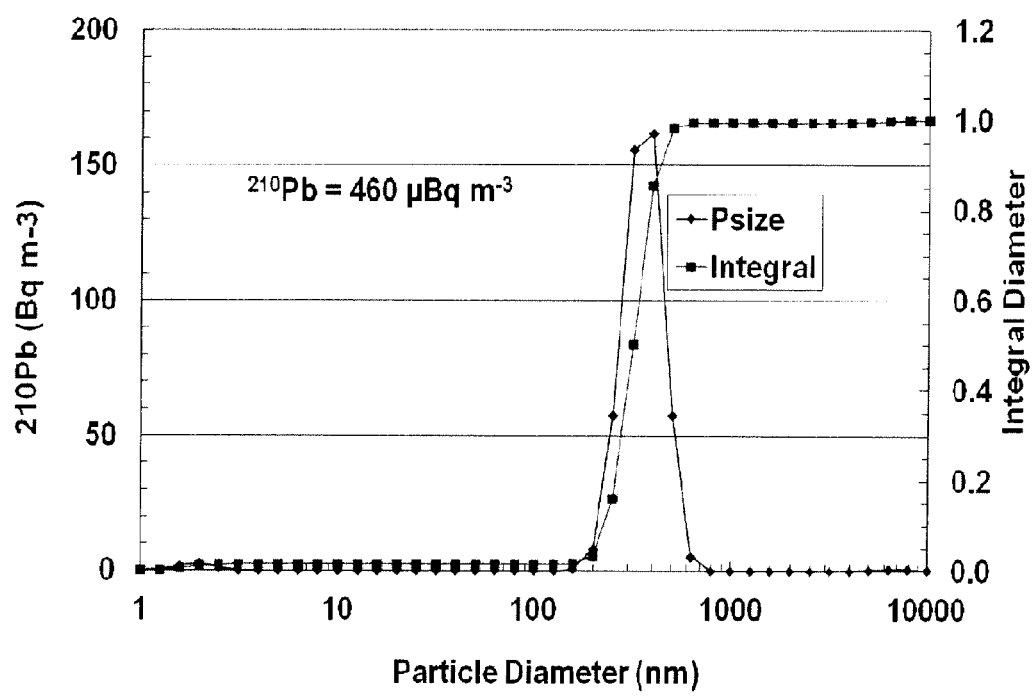

The outdoor measurements at the New Jersey home were made from February to May 2005, and the Silo measurements at Fernald were made from July to November 2002. The data in FIGS. 1A-B show that a typical outdoor size distribution has an unattached fraction of the total $^{210}$Pb activity of somewhat less than 2% with median diameter of 2 nm, and median aerosol particle diameter of 400 nm. The average outdoor radon concentration at this site, measured over 6 years, was $11\pm1$ Bq m$^{-3}$. The $^{210}$Pb, measured over this 4 month sampling interval was 460 µBq m$^{-3}$.

Figure 2A:
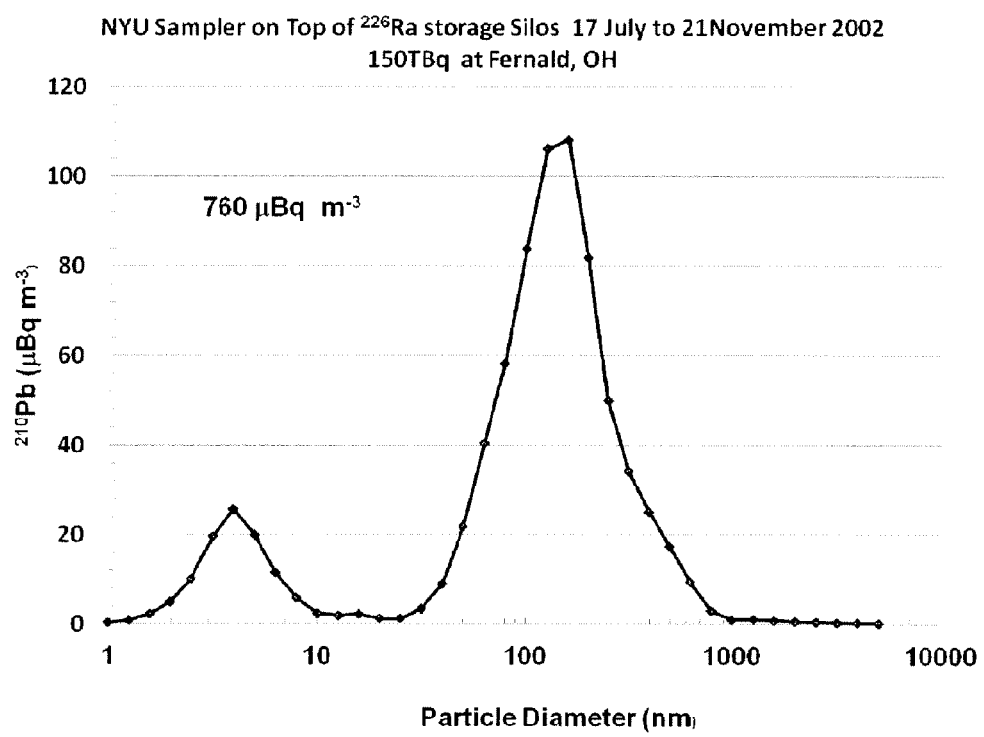
FIGS. 2A-B illustrate aerosol particle diameter distribution measured on top of the 150 TBq $^{226}$Ra storage silos at Fernald, Ohio, 17 Jul. to 21 Nov. 2002, using the IMP sampler.
Figure 2B:
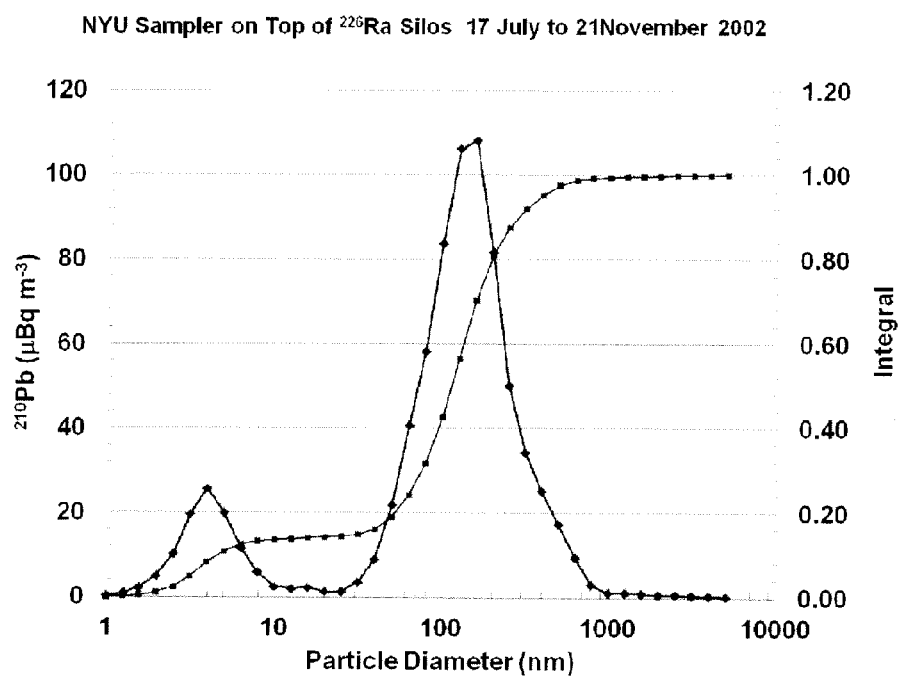
Figure 3:
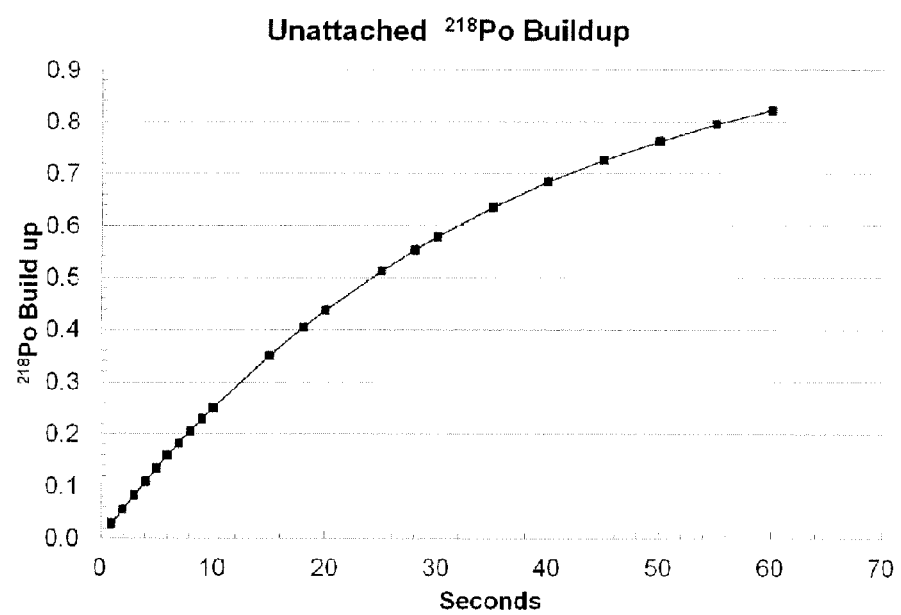
FIG. 3 is a graphical depiction of the unattached $^{218}$Po buildup over time.
Figure 4:
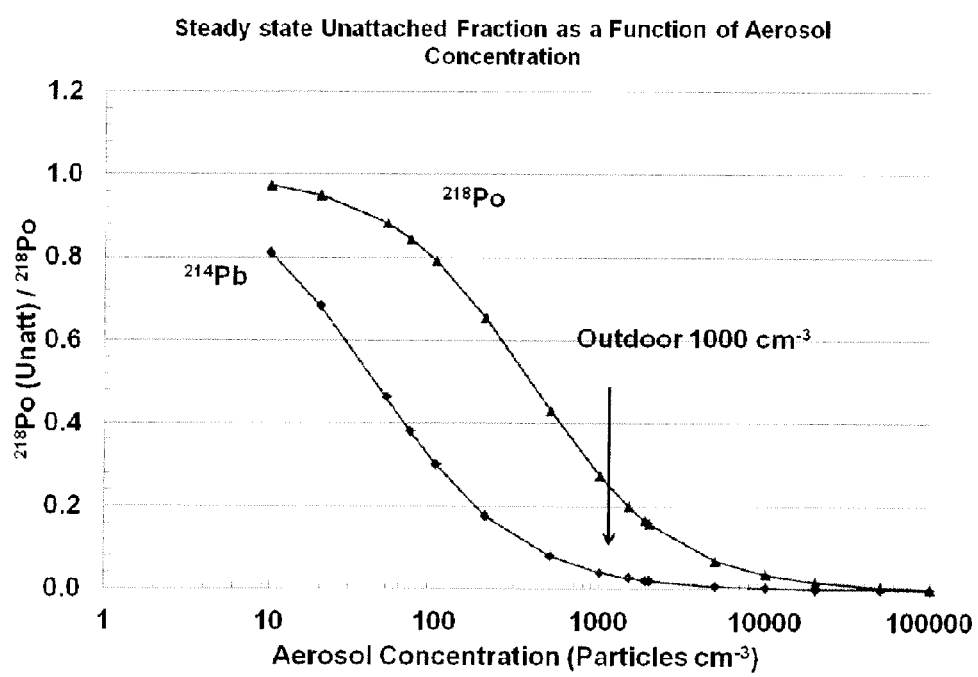
FIG. 4 is a graphical depiction of the calculated steady state unattached $^{218}$Po over the attached $^{218}$Po ratio as a function of the aerosol concentration.
Figure 5:
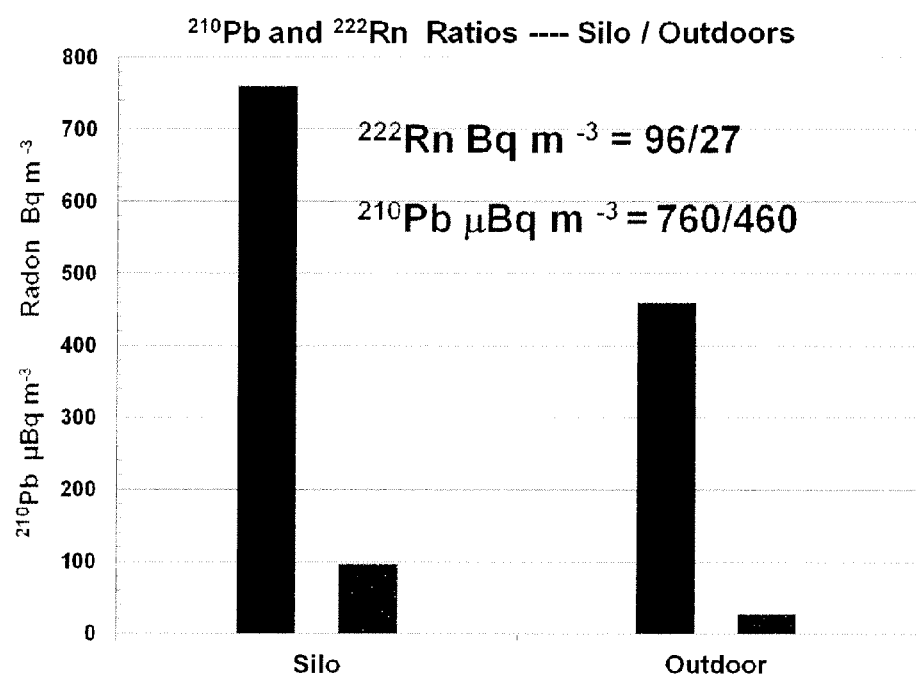
FIG. 5 is a bar graph illustrating the radioactivity of $^{222}$Rn and $^{210}$Pb in the general outdoor environment and above the silo.

The data in FIGS. 2A-B, show that over a large but contained $^{226}$Ra source (150 Tbq) the unattached fraction of the $^{210}$Pb activity was about 16% with median diameter of 4 nm and median aerosol diameter of 150 nm. The size distribution in the attached peak was much broader over the silo and probably indicates a bi or trimodal distribution in this region because of industrial activity. The radon concentration measured on top of the silos and over the same interval as the particle size sampling was $96\pm1$ Bq m$^{-3}$. The $^{210}$Pb measured over this 4 month sampling interval was 760 µBq m$^{-3}$.

The data suggest that the unattached fraction of the total $^{210}$Pb activity over the silos is due to the measurement of "freshly" exhaled radon with little chance of $^{210}$Pb buildup. Typical outdoor air has a longer time cycle to permit somewhat greater buildup of $^{210}$Pb. This is seen from the $^{210}$Pb ratios (760/460) relative to the radon ratios (96/11).

The ratio of unattached over the silo to the unattached outdoor New Jersey (16/2 to 3=8 to 5) is about what is expected from the ratio of the radon concentrations (96/11=8). This implies that the aerosol particle loading of the two locations is probably about the same.

In the observed data, there was no pressure squeeze over the $^{226}$Ra silos, just a high release of radon continuously from a large radon source. This is proof of principle that radon release could be tracked by the very short lived $^{218}$Po. Further, it should be appreciated that there are two different measurement situations. The large radon source at the tested silos were emanating radon at a more or less constant rate from a very large $^{226}$Ra source and radon could be tracked by the $^{218}$Po. In contrast, a seismic event requires detecting large transient pulses that could be coming from a large source due to squeezing of a large mass of the earth's surface.

One implementation may utilize a computer system, such as shown in FIG. 6, e.g., a computer-accessible medium 620 (e.g., as described herein, a storage device such as a hard disk, floppy disk, memory stick, CD-ROM, RAM, ROM, etc., or a collection thereof) can be provided (e.g., in communication with the processing arrangement 610). The computer-accessible medium 620 may be a non-transitory computer-accessible medium. The computer-accessible medium 620 can contain executable instructions 630 thereon. In addition or alternatively, a storage arrangement 640 can be provided separately from the computer-accessible medium 620, which can provide the instructions to the processing arrangement 610 so as to configure the processing arrangement to execute certain exemplary procedures, processes and methods, as described herein, for example.

System 600 may also include a display or output device, an input device such as a keyboard, mouse, touch screen or other input device, and may be connected to additional systems via a logical network. Many of the embodiments described herein may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Those skilled in the art can appreciate that such network computing environments can typically encompass many types of computer system configurations, including personal computers, hand-held devices, multi-processor systems, microprocessor-based or programmable consumer electronics, network PCs, minicomputers, mainframe computers, and the like. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

Various embodiments are described in the general context of method steps, which may be implemented in one embodiment by a program product including computer-executable instructions, such as program code, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

Software and web implementations of the present invention could be accomplished with standard programming techniques with rule based logic and other logic to accomplish the various database searching steps, correlation steps, comparison steps and decision steps. It should also be noted that the words "component" and "module," as used herein and in the claims, are intended to encompass implementations using one or more lines of software code, and/or hardware implementations, and/or equipment for receiving manual inputs.

With respect to the use of substantially any plural and/or singular terms herein, those having skill in the art can translate from the plural to the singular and/or from the singular to the plural as is appropriate to the context and/or application. The various singular/plural permutations may be expressly set forth herein for the sake of clarity.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:
1. An method for predicting seismic activity, comprising:
determining a current amount of unattached $^{218}$Po; and
comparing the amount of unattached $^{218}$Po to a baseline of unattached elements selected from the group consisting of $^{218}$Po, $^{214}$Pb' and $^{214}$Bi.

2. The method of claim 1, further comprising:
comparing the baseline of unattached $^{218}$Po to a concentration of attached elements selected from the group consisting of $^{218}$Po, $^{214}$Pb' and $^{214}$Bi.

3. The method of claim 1, further comprising communicating an indicated likelihood of seismic activity.

4. The method of claim 3, further comprising altering an aspect of hydraulic fracturing based upon the indicated likelihood of seismic activity.

5. The method of claim 4, wherein the aspect of hydraulic fracturing altered is selected from the group consisting of the size of the proppant and the hydraulic pressure.

6. The method of claim 1, wherein the baseline of unattached elements consists of unattached $^{218}$Po.

7. The method of claim 6, wherein the current amount of unattached $^{218}$Po is a current concentration of unattached $^{218}$Po in a defined area and the baseline concentration of unattached $^{218}$Po is a baseline concentration of unattached $^{218}$Po in the defined area.

8. The method of claim 6, wherein determining the baseline concentration of unattached $^{218}$Po comprises:

$$f_{218} = \lambda_{218}/[\beta + \lambda_{218}]$$

where,
N=aerosol particle concentration/cm$^3$
$\beta$=Attachment coefficient=$[(10^{-5}$ cm$^{-3}$ sec$^{-1}$ attachment rate) (N)]
$\lambda_{218}$=decay constant for $^{218}$Po=0.00379 sec$^{-1}$.

9. The method of claim 1, wherein determining the current concentration of unattached $^{218}$Po comprises:
interacting a scintillation screen with unattached $^{218}$Po;
counting photon emissions from the scintillation screen; and
applying a correlation factor.

10. A system for predicting seismic activity comprising:
a collection vessel having one or more inlets about a periphery and outlet;
at least one impact plate positioned within the collection vessel between the inlet and the outlet and having a central opening; and
a scintillation screen positioned between the inlet and the outlet;
wherein the one or more inlets are disposed over the impact plate but not over the opening such that attached $^{218}$Po entering the collection vessel will not pass through the opening and the scintillation screen having a mesh size selected to detect unattached $^{218}$Po.

11. The system of claim 10 further comprising a photo tube in communication with the scintillation screen.

12. The system of claim 11 further comprising a fiber optic channel connecting the scintillation screen to the photo tube.

13. The system of claim 10, wherein the scintillation screen has a mesh size of about 60 to about 400, openings per inch.

14. The system of claim 10, further comprising a counting mechanism in optical communication with the scintillation screen.

15. The system of claim 14, further comprising a counter in communication with the counting mechanism wherein the counter tracks emissions from the scintillation screen.

16. The system of claim 14, wherein the counting mechanism includes a phototube with output signal sensor.

17. A method for monitoring the real-time concentration of an unattached radioactive material:
collecting a sample of air from an environment in a collection vessel;
filtering the sample of air to remove attached particles and passing through unattached $^{218}$Po;
screening the unattached $^{218}$Po through a scintillation screen; and
counting alpha particle emissions from the unattached $^{218}$Po.

18. The method of claim 17, further comprising determining a baseline concentration of an attached $^{218}$Po.

19. The method of claim 17, further comprising providing an indication of an increase in unattached $^{218}$Po.

20. A non-transitory computer-readable memory having instructions stored thereon, the instructions comprising:
instructions for determining a current amount of unattached $^{218}$Po;
instructions for comparing the amount of unattached $^{218}$Po to a baseline of unattached elements selected from the group consisting of $^{218}$Po, $^{214}$Pb' and $^{214}$Bi; and
instructions for detecting an increase from the baseline of unattached $^{218}$Po to the concentration of unattached elements selected from the group consisting of $^{218}$Po, $^{214}$Pb' and $^{214}$Bi.

21. The non-transitory computer-readable memory of claim 20, wherein the baseline of unattached elements consists of unattached $^{218}$Po.

22. The non-transitory computer-readable memory of claim 21, wherein the instructions for determining a current amount of unattached $^{218}$Po further include receiving scintillation counts from a scintillation screen wherein the current amount of unattached $^{218}$Po is a current concentration of unattached $^{218}$Po in a defined area and the baseline concentration unattached $^{218}$Po is a baseline concentration of unattached $^{218}$Po in the defined area.

23. The non-transitory computer-readable memory of claim 20, further comprising:
instructions for communicating an indicated likelihood of seismic activity; and
altering an aspect of hydraulic fracturing based upon the indicated likelihood of seismic activity wherein the aspect of hydraulic fracturing altered is selected from the group consisting of the size of the proppant and the hydraulic pressure.

* * * * *